United States Patent [19]

Malhotra

[11] Patent Number: 4,908,410

[45] Date of Patent: Mar. 13, 1990

[54] MODIFIED POLYTETRAFLUOROETHYLENE FINE POWDER AND PREPARATION THEREOF

[75] Inventor: Satish C. Malhotra, Parkersburg, W. Va.

[73] Assignee: E. I. Du Pont De Nemours and Company, Wilmington, Del.

[21] Appl. No.: 302,759

[22] Filed: Jan. 27, 1989

[51] Int. Cl.$^4$ ............... C08F 25/00; C08F 16/24; C08L 83/00

[52] U.S. Cl. .................. 525/276; 523/201; 526/247

[58] Field of Search .................. 526/247; 523/201

[56] References Cited

U.S. PATENT DOCUMENTS

| | | |
|---|---|---|
| 3,978,030 | 8/1976 | Rosnick ............... 526/247 |
| 4,399,264 | 8/1983 | Squire ................. 526/247 |
| 4,565,855 | 1/1986 | Anderson et al. ...... 526/247 |
| 4,594,399 | 6/1986 | Anderson et al. ...... 526/247 |
| 4,639,497 | 1/1987 | Knight et al. ........ 526/247 |
| 4,748,217 | 5/1988 | Malhotra ............. 526/247 |
| 4,754,009 | 6/1988 | Squire ................ 526/247 |

FOREIGN PATENT DOCUMENTS

| | | | |
|---|---|---|---|
| 0073087 | 3/1983 | European Pat. Off. ........ | 526/247 |
| 0111343 | 6/1984 | European Pat. Off. ........ | 526/247 |
| 1106343 | 3/1968 | United Kingdom ........... | 526/247 |
| 8304032 | 11/1983 | World Int. Prop. O. ....... | 526/247 |

Primary Examiner—Joseph L. Schofer
Assistant Examiner—M. N. Sarofian

[57] ABSTRACT

A modified fine powder polytetrafluoroethylene, and the process for preparing the polymer, in which the modifying copolymerizable monomer is a selected dioxole monomer. The composition is dispersion-process-produced and includes a core portion having a copolymer comprising repeat units provided by tetrafluoroethylene monomer and dioxole monomer, and a shell portion that is substantially free of dioxole units. The core and shell portions may contain perfluoro (n-propylvinyl) ether. The composition is useful for paste extrusion, such as in wire coating and tubing applications.

8 Claims, No Drawings

MODIFIED POLYTETRAFLUOROETHYLENE FINE POWDER AND PREPARATION THEREOF

FIELD OF THE INVENTION

This invention relates to modified polytetrafluoroethylene (PTFE) fine powder compositions and the preparation thereof and articles formed therefrom. More particularly, this invention relates to PTFE fine powder compositions which contain a small amount of at least one selected dioxole copolymerized therewith, and to processes for preparing such compositions.

BACKGROUND OF THE INVENTION

Polytetrafluoroethylene fine powder compositions are non-melt-fabricable and are commonly processed by paste extrusion wherein the powder is mixed with a lubricant and is then discharged through a paste extruder die to obtain films, tubes, tapes, protective coating on wire and the like.

To make "fine powder" PTFE, a process called "aqueous dispersion polymerization" is used. In this process sufficient dispersing agent is employed under mild agitation in order to produce small colloidal size particles dispersed in the aqueous reaction medium. In this procedure precipitation (i.e., coagulation) of the resin particles is avoided during polymerization. The dispersion may be used as such, or the dispersed particles may be coagulated in a separate step and the resulting fine powder obtained.

There is another PTFE material that is referred to by those skilled in the art as "granular" PTFE. Granular PTFE resins are employed in molding and ram extrusion processes to produce plastic articles, but cannot be paste extruded. They are prepared by "suspension polymerization" which involves polymerizing repeat units of tetrafluoroethylene (TFE) monomer in the presence of little or no dispersing agent and vigorously agitating the resulting polymer in order to produce a precipitated resin.

It has previously been known that if a small amount of repeat units of copolymerizable monomer is added to the repeat units of TFE monomer in preparing granular PTFE, the properties of the PTFE particles can be altered. U.S. Pat. No. 3,978,030 is directed to a copolymer of a dioxole and either chlorotrifluoroethylene, hexafluoropropylene, or TFE. However, a paste extrudable dioxole modified fine powder resin with superior tensile properties is not disclosed or suggested. U.S. Pat. No. 4,399,264 concerns a copolymer of perfluorodioxole (PD) and TFE. However, this reference does not disclose or suggest a PTFE core/shell fine powder composition with PD confined to a core portion and a shell portion free of PD.

It is an object of the present invention to provide a PTFE resin that is a clear, transparent material suitable for coating surfaces. It is a further object of this invention that such a material be capable of pigmenting to produce a variety of colorful coatings. These and other objects, features and advantages will become apparent in the description that appears below.

SUMMARY OF THE INVENTION

This invention is a modified dispersion-process-produced PTFE fine powder composition comprising a core portion and a shell portion. The core portion contains a copolymer comprising repeat units provided by a TFE monomer and repeat units provided by at least one copolymerizable monomer of the formula

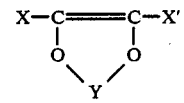

wherein X and X' are selected from the group consisting of F, Cl and H, and Y is selected from the group consisting of

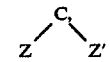

wherein Z and Z' are selected from the group consisting of F, alkyl units having from 1 to 6 carbon atoms, and fluorinated alkyl units having from 1 to 6 carbon atoms. The shell portion is substantially free of dioxole units.

DETAILED DESCRIPTION OF THE INVENTION

The monomers according to the invention and that are copolymerizable with TFE monomer are present in the copolymer chain formed therein in random recurring amounts that are small enough that their presence does not make the polymer melt-processable. The dioxole monomer is relatively highly reactive and is confined to the particle interior, and so is added as a precharge. The composition may also include other perfluoromonomers specified below during polymerization. They have low reactivities and, if used, will be present in both the core portion and the shell portion of the composition.

Particle size in the dispersion can be controlled by known procedures. For example, addition of dispersing agent can be programmed as taught in U.S. Pat. No. 3,391,099 to increase size. Generally, product particle size in the dispersion will be between 0.1 and 0.5 micrometer.

The polymerization initiator may also be added to the composition as a precharge, in increments, continuously, or in some combination thereof. The initiator can be added in an initiating amount; that is, any amount at least sufficient to promote initiation of the polymerization. The initiator can be one or more of any of the usual initiators for TFE monomer polymerization, such as ammonium persulfate (APS), potassium persulfate (KPS), disuccinic acid peroxide (DSP), a redox combination of potassium permanganate/oxalic acid and the like. Generally the initiator is used at 30–300 ppm based on water.

A dispersing agent is added to the reaction medium. It can be any of the common non-telogenic dispersing agents used in dispersion polymerization of TFE monomer. This agent may be present in a dispersing amount; that is, any amount at least sufficient to promote dispersion. The amount will be sufficient to stabilize the polymer particles in the dispersion and to keep coagulum formation at a minimum. Ammonium perfluorooctanoate (commonly called C-8) is preferred. C-8 concentrations of 0.1 to 0.5 weight percent, based on aqueous charge, are normally used.

Fine powder is obtained from the dispersion by coagulation to form agglomerates of primary particles that have an average particle diameter of 0.1 to 0.5 micrometers. Coagulation can be affected by agitation or by addition of an electrolyte.

The modified PTFE polymers according to this invention are readily processible and can be paste extruded into products such as wire insulation and tubing. Such polymers are also transparent, and thus function as a clear coating on a substrate. These clear compositions can be pigmented for a colorful appearance.

The composition according to the invention may contain repeat units provided by additional copolymerizable monomers in the core and/or shell portions. These additional copolymerizable monomers include perfluoro (n-alkyl vinyl) ether monomers of the formula $R'_f$—O—CF=CF$_2$, where $R'_f$ is a normal perfluoroalkyl radical of from 1 to 5 carbon atoms, preferably 1–3 carbon atoms. In a most preferred embodiment of the invention, the perfluoro (n-alkyl vinyl ether) monomer is perfluoro(n-propyl vinyl ether) (PPVE).

The copolymerizable monomer having the formula

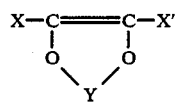

as defined earlier is known as a dioxole monomer. A preferred dioxole monomer according to the invention is perfluoro-2,2-dimethyl-1,3-dioxole.

The total amount of all comonomers is less than 0.5 weight percent based on composition weight.

One embodiment of the invention features a primary particle size of between 0.1 and 0.5 micron, a standard specific gravity (SSG) of less than 2.20, maximum tensile stress greater than 19.6 MPa, and break elongation in excess of 300 percent.

The process according to the invention involves the dispersion polymerization of repeat units provided by TFE monomer in the presence of repeat units provided by dioxole monomer, in an aqueous medium and optionally in the presence of repeat units provided by an additional copolymerizable monomer such as perfluoro(n-alkyl vinyl)ether (and preferably PPVE) monomers. The dioxole monomer is added to the TFE monomer as a precharge and such that it is confined to the core portion of the composition. However, the additional copolymerizable monomer may be added to the system so that it may be present in both core and shell portions. The shell portion is substantially free of dioxole units. The polymerization is carried out in an aqueous medium in the presence of an initiating amount of a polymerization initiator and a dispersing amount of a dispersing agent at a temperature below 125° C. at a pressure (of TFE) of 7–40 kg/cm² (0.7–4.0 MPa).

The polymerization is carried out in a gently agitated aqueous medium. The medium will contain a non-telogenic dispersing agent such as ammonium perfluorooctanoate. The ammonium perfluorooctanoate is partly precharged in 0.003–0.1 weight percent concentration based on aqueous charge, with the balance added either intermittently or continuously during polymerization to a total concentration of 0.1–0.5 weight percent.

The process according to the invention is typically carried out at a temperature of between 50° and 100° C. A high quality wax is used to control coagulum formation in the high solid dispersion.

TESTING INFORMATION

Several properties of the polymers of this invention are determined according to procedures described as follows:

(1) Determination of perfluoro(n-propyl vinyl)ether (PPVE) Content in the Polymer The PPVE content was determined by Fourier Transform (FT) IR spectroscopy. The C—O—C band at 995 cm$^{-1}$ was used. A 0.3 g sample of the polymer was leveled between pieces of aluminum foil in a cylindrical mold, 2.86 cm in inside diameter. A pressure of 1409 kg/cm² (138 MPa) was applied for one minute at ambient temperature. The pressed sample, which was 0.025 cm thick, was then analyzed by IR. The sample was scanned from 1040 to 877 cm$^{-1}$. A straight base line was drawn from the absorbance minimum at 1010 cm$^{-1}$ to that at 889 cm$^{-1}$. The ratio of the absorbance from the base line to the maximum at 995 cm$^{-1}$ to the absorbance from the base line to the maximum at 935 cm$^{-1}$ was obtained. The actual weight percent PPVE was determined from a calibration curve or by multiplying the ratio by the following factor:

| Absorbance Ratio | Factor |
| --- | --- |
| 0.01 | 0.40 |
| 0.02 | 0.30 |
| 0.04 | 0.25 |
| 0.08 | 0.19 |

(2) Determination of Perfluoro-2,2-dimethyl-1,3-dioxole (PDD) Content in the Polymer The dioxole content was also determined by FT IR spectroscopy. The perfluoroether band at 988 cm$^{-1}$ was used. The IR was calibrated against Nuclear Magnetic Resonance (NMR). The ratio of the absorbance at 988 cm$^{-1}$ to that at 935 cm$^{-1}$ was multiplied by a factor of 0.1053 to obtain percent dioxole by weight.

(3) Standard Specific Gravity

Standard Specific Gravity (SSG) was measured by water displacement of a standard molded test specimen in accordance with ASTM D1457-69. The standard molded part was formed by preforming 12.0 g of the powder in a 2.86 cm diameter die at a pressure of 352 kg/cm² (35 MPa), followed by the sintering cycle of the preform of heating from 300° C. to 380° C. at 2° C./minute, holding at 380° C. for 30 minutes, cooling to 295° C. at 1° C./minute and holding at this temperature for 25 minutes, after which the specimen was cooled to 23° C. and tested for specific gravity.

(4) Raw Dispersion Particle Size (Average)

Raw Dispersion Particle Size (RDPS) was determined from the absorbance (scattering) of a dilute aqueous sample at 546 millimicrons using a Beckman DU spectrophotometer and is based on the principle that the turbidity of the dispersion increases with increasing particle size, as shown in U.S. Pat. No. 4,036,802.

(5) Tensile Stress and Elongation

Tensile stress and elongation were determined by the method described in ASTM D1457-75. A preform pressure of 13.8 MPa was used.

EXAMPLES

Example 1

A 36-liter polykettle vessel was charged with 20.9 kg of demineralized water, 600 g of paraffin wax, 5.0 g of ammonium perfluorooctanoate dispersant. The contents of the vessel were heated to 65° C., evacuated, and purged with TFE monomer. Thereafter, 14.0 g of PDD and 19.9 g of PPVE were added to the vessel. The contents of the vessel were agitated at 46 rpm. The temperature was increased to 80° C., and TFE monomer was then added to the vessel until the pressure was $2.61 \times 10^6$ Pa. A 180 ml (1 g/l) solution of ammonium persulfate (APS) initiator was injected into the vessel at 90 ml/min. The polymerization began after the start of the initiator injection, as evidenced by a drop in pressure. TFE monomer was added to the vessel to maintain the pressure. After 1.36 kg of TFE monomer had reacted, a solution of 28 g of ammonium perfluorooctanoate in 1000 ml aqueous solution was pumped into the vessel at 50 ml/min.

Polymerization was continued until 11.8 kg of TFE monomer had reacted; thereafter the vessel was vented, evacuated, and purged with $N_2$. The contents were discharged from the vessel and cooled. The supernatant wax was removed from the dispersion. The dispersion was diluted to 15% solids with water and coagulated in the presence of ammonium hydroxide under high agitation conditions. The coagulated fine powder was separated and dried at 150°–160° C. for three days.

The dispersion had an RDPS of 0.210 micron. The resin had an SSG of 2.155. The comonomer contents could not be determined accurately due to close absorption frequencies of repeat units of PDD and PPVE. The maximum tensile stress was 29.0 MPa and break elongation was 339%.

Comparative Example 1

Example 1 was repeated except that 33.7 g of PPVE was used as a copolymerizable monomer and no PDD was added to the polymer.

The dispersion had an RDPS of 0.156 micron. The resin had an SSG of 2.155 and a PPVE content of 0.114 weight percent. The maximum tensile stress was 25.6 MPa and break elongation was 278%.

A comparison of Example 1 to Comparative Example 1 reveals that the tensile properties of a resin modified with both PPVE and PDD are superior to those of the same resin modified with PPVE alone. Compare tensile stress and elongation of the dioxole modified resin (29.0 MPa and 339%) to those of the resin not modified with dioxole (25.6 MPa and 278%).

Example 2

The vessel of Example 1 was charged with 21.4 kg of demineralized water, 600 g of paraffin wax, and 30 g of C-8. At a temperature of 65° C., the vessel was evacuated and purged with $N_2$. Thereafter, 14.3 g of PDD was precharged into the vessel after the final evacuation. The vessel was agitated at 46 rpm, and the temperature was increased to 90° C. The vessel was pressurized with TFE monomer to 2.75 MPa. A mixture of 0.1 g of APS and 10 g of DSP dissolved in 500 ml of water was added to the vessel at 90 ml/min. After 11.8 kg of TFE monomer had been reacted, the vessel was vented. The dispersion was treated as in Example 1.

The dispersion had an RDPS of 0.210 micron. The resin had an SSG of 2.163 and a PDD content of 0.088%. The maximum tensile stress was 27.2 MPa and break elongation was 382%.

Comparative Example 2

Example 2 was repeated except that 14.4 g of perfluorobutyl ethylene were precharged into the vessel instead of the PDD.

The dispersion had an RDPS of 0.136 micron. The resin had an SSG of 2.161. The maximum tensile stress was 23.8 MPa and break elongation was 344%.

A comparison of Example 2 to Comparative Example 2 reveals that the tensile properties of a resin modified with PDD are superior to those of the same resin modified with PFBE. Compare tensile stress and elongation of the dioxole-modified resin (27.2 MPa and 382%) to those of the PFBE-modified resin (23.8 MPa and 344%).

I claim:

1. A modified dispersion-process-produced polytetrafluoroethylene fine powder composition comprising a core portion having a copolymer comprising repeat units provided by a tetrafluoroethylene monomer and repeat units provided by at least one copolymerizable monomer of the formula

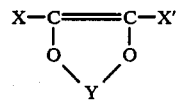

wherein X and X' are selected from the group consisting of F, Cl and H, and Y is selected from the group consisting of

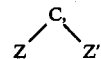

wherein Z and Z' are selected from the group consisting of F, alkyl units having from 1 to 6 carbon atoms, and fluorinated alkyl units having from 1 to 6 carbon atoms, and a shell portion that is substantially free of dioxole units.

2. The composition of claim 1 wherein repeat units provided by perfluoro(n-alkyl vinyl) ether monomers of the formula $R'_f$—O—CF=CF$_2$ wherein $R'_f$ is a normal perfluoroalkyl radical having from 1 to 5 carbon atoms are contained in one or more portions selected from the group consisting of core and shell portions.

3. The composition of claim 2 wherein the vinyl ether monomer is perfluoro(n-propyl vinyl)ether.

4. The composition of claim 1 wherein the total of the comonomers present is less than 0.5 weight percent based on the weight of the composition.

5. The composition of claim 2 wherein the total of the comonomers present is less than 0.5 weight percent based on the weight of the composition.

6. The composition of claim 1 wherein the copolymerizable monomer is perfluoro-2,2-dimethyl-1,3-dioxole.

7. The composition of claim 1 in the form of a paste extruded article.

8. The composition of claim 1 wherein said tetrafluoroethylene monomer is copolymerized with repeat units of a copolymerizable perfluoro(n-alkyl vinyl ether) monomer where the alkyl group has from 1 to 3 carbon atoms.

* * * * *